INVENTOR.
VERNON E. STILES
BY
ATTORNEY

INVENTOR.
VERNON E. STILES
BY
ATTORNEY

United States Patent Office 3,578,432
Patented May 11, 1971

3,578,432
METHOD OF IRRIGATION
Vernon E. Stiles, 1012 Brookdale Place,
Fullerton, Calif.
Filed Mar. 22, 1968, Ser. No. 715,208
Int. Cl. *A01g 25/00*
U.S. Cl. 71—1                 19 Claims

ABSTRACT OF THE DISCLOSURE

Irrigation water is contacted with ion exchange resins charged with ions of plant nutrients, e.g., ammonium, nitrate, sulfate, potassium, to replace the ions of the salts contained in the irrigation water with ions of nutrient value. This treatment obviates the difficulties encountered in arid and semi-arid areas with irrigation water containing a high content of dissolved salts which otherwise tend to accumulate in the soil to phytotoxic levels. In a typical embodiment, a column of mixed anion and cation exchange resins charged with nitrate and ammonium, respectively, and having a size of about 1.5 feet in diameter and about 10 feet in length is used to treat irrigation water having a total of about 300 p.p.m. hardness at a liquid hourly space velocity of about 50 liquid volumes per volume per hour. This bed within a four-hour period treats a sufficient quantity of water to irrigate one acre one inch in depth and results in the addition of about 210 parts per million of ammonium nitrate to the irrigation water. When this is practiced over a year's irrigation involving approximately 3 acre feet of water per acre of irrigated land, the amount of nitrogen supplied is from about 400 to 850 pounds nitrogen, ample to supply all of the nutrient requirements of the plants.

DESCRIPTION OF THE INVENTION

Figure 1:
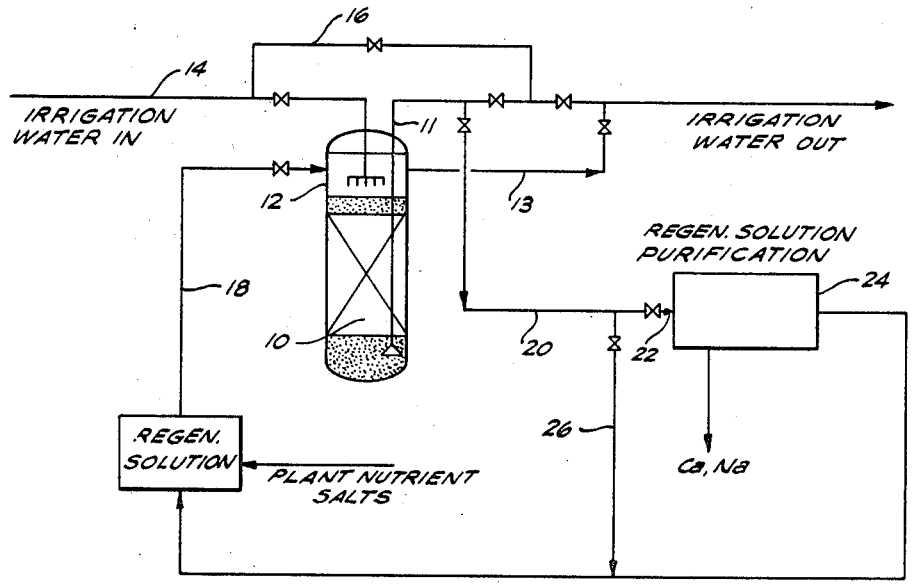

The invention relates to a method for irrigation of crop land in arid and semi-arid areas and in particular relates to a method for the irrigation which avoids the troublesome accumulation of salts in the soil.

Irrigation water used in the agronomy of arid and semi-arid areas generally has a high salt content resulting from high evaporation losses during the distribution of the water to the irrigation sites. The salts contained in this water tend to accumulate in the soil surface and unless removed ultimately will reach phytotoxic levels, thereby preventing further use of the soil. To prevent the accumulation of soluble salts in the soil surface, the irrigation methods commonly leach the soil to remove these salts. The leaching process consumes further quantities of the water which are not useable for irrigation and results in the accumulation of a large body of high salt content water, e.g., the Salton Sea in Southern California.

The presence of the salts in the irrigation water also interferes with the fertilization which is commonly practiced by the addition of plant nutrients to the irrigation water. The addition of plant nutrients which are precipitants of the salts, e.g., ammonium, ammonium thiosulfate, etc., is often prevented unless precaution is taken to prevent the congeneric salts such as the calcium bicarbonates from precipitating upon the addition of these nutrients.

It is an object of this invention to provide an improved method for the irrigation of soil.

It is also an object of this invention to provide an improved method for the fertilization of plants.

It is an additional object of this invention to provide a method for removing the objectionable salt content of irrigation waters prior to use of the waters in irrigation.

Other and related objects will be apparent from the following description.

The invention comprises the treatment of irrigation water by contacting the irrigation water with ion exchange resins which are charged with plant nutrient salts. Passage of the saline irrigation water over columns of the ion exchange resins which have been charged with the plant nutrient salts results in replacement of the cations and/or anions of the irrigation water with cations and/or anions having plant nutrient value. This treatment of the irrigation water precedes the application of the water to the soil and is performed so as to remove from 10 to 100 percent of the original salt content of the irrigation water. In preferred embodiments, the treatment is performed to remove the objectionable cations in the irrigation water and to replace these with cations of plant nutrient value such as ammonium or potassium.

Waters commonly used for irrigation contain from 100 to about 500 parts per million of dissolved salts. These salts are commonly salts of the alkali metals and alkaline earth metals. Sodium, calcium and magnesium are the most prevalent cations with lesser amounts of others such as potassium, lithium, barium, cesium, etc. The anions present in the waters include carbonates, bicarbonates, sulfates, halides, e.g., fluorides, chlorides, bromides or iodides, etc. Any or all of these ions present in the aforeindicated quantities in irrigation water can be replaced with ions having plant nutrient value such as the following cations: ammonium, potassium, cupric, ferric, zinc, cobalt, etc.; or the following anions; nitrate, nitrite, sulfate, thiosulfate, orthophosphate, polyphosphate, etc.

In the preferred application, all or a portion of the cations present in the water commonly used for irrigation are replaced with any of the aforementioned plant nutrient cations. Optionally, this treatment can be combined with replacement of all or a portion of the anions present in the water with any of the aforementioned plant nutrient anions. Alternatively, the cations can be permitted to remain in the irrigation water and all or a portion of the anions present can be replaced with the nitrate anion, a plant nutrient anion which would not precipitate dissolved alkaline earth metal cations. The former two procedures are, however, preferred because these remove the more objectionable alkali metal and alkaline earth metal cations which can ultimately accumulate to toxic levels in the soil.

Various inorganic ion exchange solids can be employed and the operability of the exchange process is not dependent on the nature of the ion exchange solid. Suitable solids include zeolites, heteropolyacid salts, hydrous oxides and insoluble salts. Examples of various zeolites that can function as cation exchange resins are set forth in the following table:

TABLE 1

| Zeolite | Composition | Hydrated exchange capacity meg./g. |
|---|---|---|
| (a) Fibrous zeolites: | | |
| Edingtonite | $Ba[Al_2Si_3O_{10}]\cdot 4H_2O$ | 3.90 |
| Natrolite | $Na_2[Al_2Si_3O_{10}]\cdot 2H_2O$ | 5.30 |
| Scolecite | $Ca[Al_2Si_3O_{10}]\cdot 3H_2O$ | 5.00 |
| (b) Lamellar zeolites: | | |
| Stilbite | $(NaCa_{1/2})[AlSi_3O_8]\cdot 3H_2O$ | 3.20 |
| Heulandite | $Ca[Al_2Si_6O_{16}]\cdot 5H_2O$ | 3.30 |
| (c) Three-dimensional zeolites: | | |
| Analcite | $Na[AlSi_2O_6]\cdot H_2O$ | 4.50 |
| Mordenite | $(Ca_{1/2}Na)[AlSi_5O_{12}]\cdot 3\cdot 3H_2O$ | 2.30 |
| Chabazite | $(Ca_{1/2},Na)[AlSi_2O_6]\cdot 3H_2O$ | 4.00 |
| Faujasite | $(Ca,Na_2)[Al_2Si_5O_{14}]\cdot 6.6H_2O$ | 3.90 |
| (d) Felspathoids: | | |
| Leucite | $K[AlSi_2O_6]$ | 4.60 |
| Sodalite | $Na[AlSiO_4]\cdot 2/3NaCl$ | 9.20 |
| Ultramarine | $Na[AlSiO_4]\cdot 1/3Na_2S_x$ | 8.30 |
| Cancrinite | $(Na,Ca_{1/2})[AlSiO_4]\cdot 2/3(Na_2,Ca)CO_3$ | 10.90 |

Examples of various heteropolyacid salts include ammonium molybdophosphate, ammonium molybdoarsenate, ammonium tungstophosphate, quinoline molybdophosphate. Examples of various hydrous oxides include hydrous alumina, titania and zirconia. These hydrous oxides are usually prepared by precipitation from acid solutions of the appropriate salts by the addition of an alkali and under suitable conditions flocculant or gelatinous precipitates are formed which on drying yield granular products which are stable in aqueous suspensions and which can be pelleted to prepare the particles of ion exchange solids useful for treatment of irrigation water according to this invention. Other inorganic ion exchange solids that can be used include the insoluble salts of polybasic metals such as zirconium phosphate, tungstate or molybdate, etc.

Inorganic anion exchange solids which can be employed include inorganic solids possessing anion exchange capacity and examples of such are the hydrous oxides of various metals such as chromium oxide, ferric oxide, bismuth oxide, thorium oxide, tin oxide, niobium oxide, tantalum oxide, etc. These hydrous oxide ion exchange solids can be prepared by suitable precipitation reactions as described in Journal of American Chemical Society, volume 78, page 249 and 694 (1956). The preparation comprises raising the pH of a solution of the metal so as to precipitate the metal as a hydrous oxide. Such precipitation is effected by the addition of a base, usually ammonia, to acidic solutions of the particular metal. The flocculant or gelatinous precipitate is collected by conventional solid-liquid separation, dried, ground and sized to the desired subdivision. Materials useful as inorganic ion exchange solids are also commercially available.

The preferred ion exchange solids are synthetic resins possessing ion exchange properties. The cationic exchange resins are generally polycarboxylic acid or polysulfonic acid resins. Cation exchange resins of very low cost can be prepared by sulfonating carbonaceous material such as bituminous coal, lignites, peat, etc., with $SO_3$, $H_2SO_4$ or chlorosulfonic acids. This treatment can yield cation exchange resins with capacities of 8–13 kilograms calcium per cubic foot. Cation exchange resins of higher capacity can also be prepared synthetically. The synthetic sulfonic acid cationic exchange resins can be prepared quite readily by the reaction of an aldehyde, phenol and a sulfonic acid or a sulfide. Other preparations involve the sulfonation with sulfuric acid of the styrene-divinylbenzene copolymer which can contain from about 5 to about 35 percent of the divingylbenzene monomer. The carboxylic acid type cationic exchange resins can be prepared at low costs by nitric acid oxidation of coal. Entirely synthetic resins of greater capactiy can be prepared by the reaction of phenol, acrolein and the semi-amide of oxamic acid. Other preparations include the copolymerization of methacrylic or acrylic acid with divinyl benzene. These organic cationic exchange resins are commercially available and include materials such as Amberlite IR-120, Dowex 50, Chempro C-20, Permitit 0, ZeoKarb 225. All of the latter are of the polystyrene base with nuclear sulfonic acid groups.

The organic anion exchange resins can be prepared by polymerization of an aromatic amine and formaldehyde or a polyamine, phenol and formaldehyde. Other preparations have included the nitration and subsequent reduction of a styrene-divinylbenzene copolymer or the chloromethylation and subsequent amination of a styrene-divinylbenzene copolymer. Examples of various commercially available anion exchange resins include the Amberlite 400 series, Dowex 1 and 2, Duolite A-101 and 102, Permutit S-1 and S-2 and FF, all of which are the polystyrene structure with a nuclear quaternary group.

FIG. 1 illustrates the use of the ion exchange resin as a packed bed 10 contained within a vessel 12 as in conventional ion exchange practice. The particle size can be widely varied and the solids having a majority of the particles passing an 8 but retained on about a 400 mesh screen can be employed. The size range most commonly employed is from about 0.25 to about 0.75 millimeter average particle diameter. The coarser size solids can be used in columnar contacting when pressure drop limitations require a minimum flow resistance across the bed of solids or can be used in settling-pond treatments where low space velocities can be economically achieved. The ion exchange solid is contained within a vessel having length to diameter ratios from about 2 to about 100, preferably from about 3 to about 25.

The capacity of the ion exchange resin can be from about 1 to about 100 kilograms of hardness calculated as calcium carbonate per cubic foot of resin. Preferably, high capacity ion exchange resins are used such as those having capacities from about 15 to 90 and most preferably from about 25 to 65 kilograms calcium carbonate per cubic foot.

The waters treated in accordance with this invention are irrigation waters and the following table presents analyses of various waters suitable for irrigation purposes:

TABLE 2

| Water | SiO₂ | Iron | Calcium | Magnesium | Sodium and potassium | Bicarbonate | Sulfate | Chloride | Nitrate | Total hardness |
|---|---|---|---|---|---|---|---|---|---|---|
| 1 | 2.1 | 0.12 | 4.4 | 1.0 | 3.9 | 16 | 9.8 | 3.2 | 0.31 | 15 |
| 2 | 6.4 | 0.2 | 34 | 9.7 | 5.1 | 146 | 12 | 4.5 | | 125 |
| 3 | 7.8 | | 17 | 7.1 | 23 | 45 | 43 | 28 | | 72 |
| 4 | 8.5 | 0.1 | 143 | 20 | 157 | 306 | 133 | 276 | | 440 |
| 5 | | 0 | 75 | 21 | 36 | 223 | 130 | 39 | | 274 |

The waters available for irrigation purposes have a relatively high total hardness; water compositions numbers 4 and 5 are representative of the waters that are commonly available in arid and semi-arid regions where irrigation is practiced. Frequently these waters have total hardnesses from about 100 to 1000 parts per million.

The ion exchange resins are employed for treatment of the waters to effect exchange of the cationic or anionic impurities contained therein. The water can be treated in separate columns such as 10 of cationic exchange and anionic exchange resins or, preferably, the exchange resins can be admixed in a single vessel to effect the simultaneous exchange of the cations impurities in the irrigation water. Generally the treatment applied is effective to exchange from 5 to 100 percent, preferably from 30 to 90, and most preferably from about 40 to 60 percent of the dissolved salts in the irrigation water.

Preferably the treatment is applied to exchange principally the cation impurities; however, it is within the scope of this invention to apply this treatment to remove only the anion impurities or to remove the cation and anion impurities simultaneously. When mixed beds of resins are employed, the proportion of the resins can be from 10/90 to 90/10; preferably from 30/70 to 70/30; parts of the anion exchange resin to the cation exchange resin. The relative proportion depends on the exchange capacity of the particular resin employed as well as the proportion of the anion and cation impurities desired to remove.

The water is introduced through line 14 and passed through the column of the ion exchange resin with a space velocity from about 1 to 100 liquid volumes per hour. The space velocity can be varied within this range and preferred values are from 5 to 75 and, most preferably, from about 15 to 65 volumes per volume per hour.

After the ion exchange solid has been substantially depleted of its plant nutrient ions, it can be regenerated by contacting with an aqueous solution of the plant nutrients. The water is passed through line 16 and regeneration solution is introduced through line 18. As in conventional treatments, the bed of solids can be back flushed by introducing a water flush into line 11 and out drain 13, thereby flushing filtered solids from the surface to the bed out of treatment vessel. This back flushing will usually precede the regeneration of the ion exchange solid, although back flushing to displace the regeneration fluid from the pores of the solids in bed 10 can also be practiced after regeneration and before use of the resin bed to treat the water. The used regenerating solution is removed through line 20 and all or a portion can be diverted through line 22 to purification zone 24 described in greater detail in regard to FIGS. 4–7. The balance of the used solution is recycled through line 26 and fresh makeup solution is added to replenish the nutrients exchanged onto the bed 10.

Two or more vessels 12 with resin beds can be used alternately to provide a continuous supply of treated waters or, the bed 10 can be regenerated between irrigation periods. All or a portion of the irrigation water can be treated in accordance with this invention.

The amount of water employed in irrigation varies considerably and depends on the type of crop as well as the aridness of the area. The amount of water employed can vary from 1 to about 20 acre feet of water per year. Examples of various requirements are about 8 acre feet per year of water for seedless grapes, from 10 to 15 acre feet per year for date production, and from 2 to about 5 acre feet per year for most garden crops. The plant nutrient requirements also vary widely depending on the soil conditions and the particular crop. Generally, the crops require from about 100 to about 600 pounds nitrogen per acre per year. The phosphate requirements vary considerably for the local soil conditions and can be from about 20 to about 800 pounds as $P_2O_5$ per acre per year. Similarly, the sulfur requirements can be from about 10 to about 300 pounds per acre per year and the potassium requirements from about 10 to about 400 pounds per acre per year. All or part of the plant nutrient requirements can be furnished by ion exchange of the irrigation water with plant nutrients in accordance with my invention.

Figure 2:
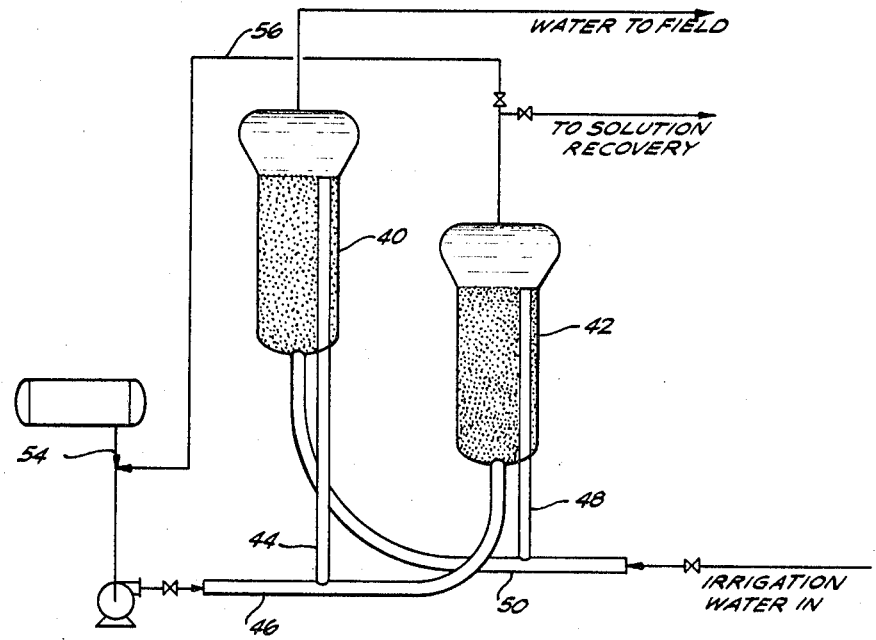

For large volume treatment of irrigation canal waters, large fluidized bed reactors shown in FIG. 2 can be used. These are filled with spherical ion exchange resin beads and the resin can be continuously moved from a water-treating zone in vessel 40 to a resin-regenerating zone in vessel 42 through standpipe 44 and line 46 and returned to the water treating zone through standpipe 48 and line 50. For these large volume operations it is economically attractive to pass all or a portion, e.g., from 5 to 100 percent, preferably from 10 to 25 percent, of the used regeneration fluid circulated in the system through line 52 to a treatment for the recovery of inorganic salts from the resin regenerating solutions. Typical solutions are ammonium nitrate and ammonium sulfate solutions of from 0.2 to 10 normal concentration. A fresh solution of a plant nutrient salt can be introduced through line 54 and be admixed with the recycled solution from line 56. "Salting out" effects and low solubilities of carbonates and bicarbonates of sodium, calcium and magnesium in highly concentrated salt solutions at low temperatures can be used as described with regard to FIG. 5 to precipitate the unwanted salts from the resin regenerant solutions.

Figure 3:
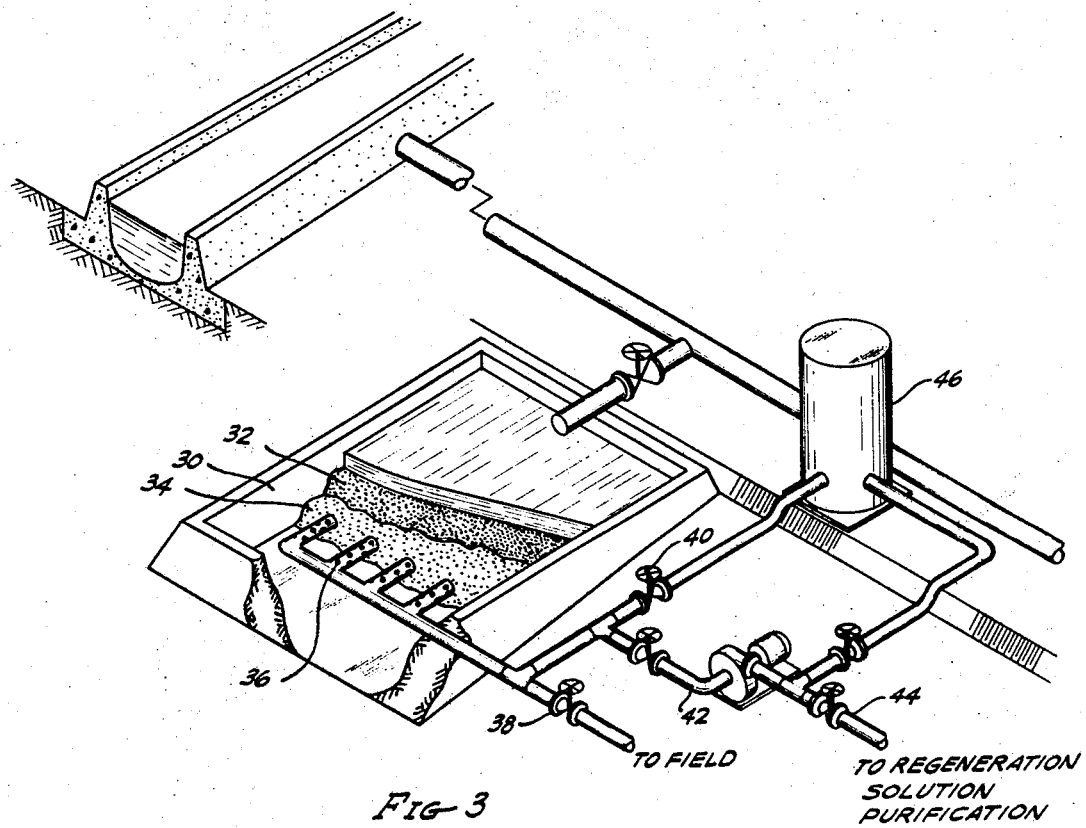

FIG. 3 illustrates facilities wherein a large volume stream of irrigation water can be efficaciously treated by diverting and slowly passing it through large ponds such as 30 filled with low cost ion exchangers shown at 32 such as sulfonated coal or other natural polymeric materials. A porous granular material such as sand or gravel 34 can be used to support the resin above the collection headers 36. The solid can be regenerated by draining the pond, closing valve 38 and gravitating regenerating solutions such as ammonium chloride, ammonium nitrate, ammonium sulfate, potassium nitrate, etc., into the pond through valve 40. The regenerating solution is left in contact with the solid for sufficient time, e.g., 1 to 24 hours to complete the exchange and then the solution is pumped out through line 42. From 10 to 100 percent of the solution is passed through line 44 to solution purification (see FIGS. 4–7) while the balance is returned to the hold tank 46 where it is admixed with fresh regenerating solution.

Figure 4:
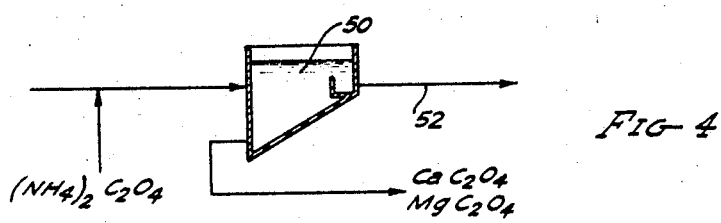

The aqueous effluent from the regeneration step can be treated to recover the residual amounts of plant nutrients. As illustrated in FIG. 4, the cations removed from the ion exchange resin such as the calcium and magnesium can be precipitated by the addition of oxalic acid or a soluble oxalate salt such as ammonium oxalate to the solution. These alkaline earth metals are precipitated in settling vessel 50 as insoluble oxalates such as calcium or magnesium oxalate and the solution removed through line 52 is thus purified of the cation impurities and can be reused with or without prior concentration in further regenerations. In this manner, substantially all of the plant nutrient content of the regenerating solution can be utilized.

Figure 5:
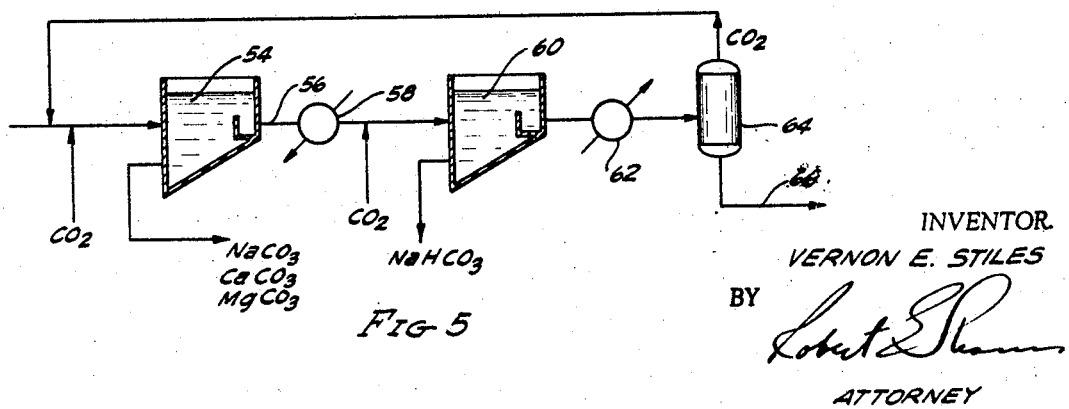

FIG. 5 illustrates another regeneration treatment which purifies the regenerating solution of sodium as well as the alkaline earth cations. In this treatment, the solution is contacted with sufficient carbon dioxide to precipitate the alkaline earth cation impurities and some of the sodium as insoluble carbonates which are removed in settling vessel 54 and the clarified solution is withdrawn through line 56. The solution can then be cooled in exchanger 58 to a temperature of about 10° to 30° C. and sufficient carbon dioxide can be added to precipitate additional quantities of sodium as the bicarbonate which is removed in settling vessel 60. The clarified solution can be heated in exchanger 62 to raise its temperature to about 40°–90° C. and the excess carbon dioxide will be volatilized and removed in vessel 64 with the regenerated solution recovered through line 66. The carbon dioxide can be recycled to contact new quantities of used regeneration solution.

Figure 6:
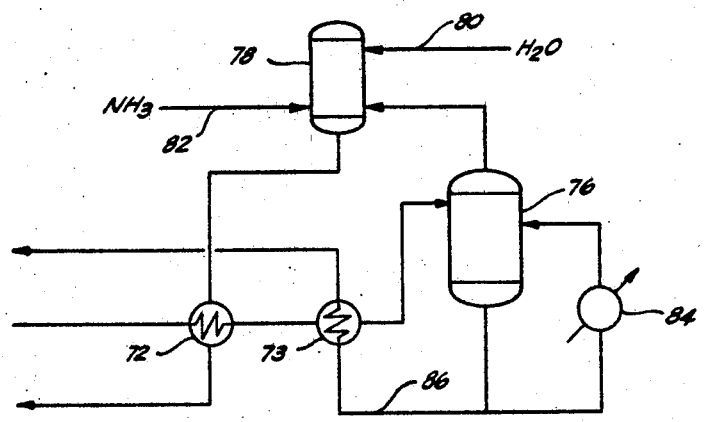

FIG. 6 illustrates another method for regenerating the spend solution. This method is particularly useful when aqueous solutions of ammonium salts are used in regeneration of a cation exchange solid. The spent solution containing sodium and alkaline earth metal cations is introduced through line 70 into indirect heat exchange in 72 with reconstituted solution leaving the unit through line 74 and then through exchange 73 in indirect heat exchange with the rejected saline solution from vessel 76. The warm solution is then introduced into vessel 76 into contact with vapors of ammonia and water evolved from the liquid in this vessel. The ammonia and some water is flashed from the solution and passes overhead to vessel 78 where the ammonia is absorbed by water introduced by line 80. Fresh ammonia or a suitable ammonium salt is added through line 82. Preferably, solutions of ammonium salts such as the chloride, bicarbonate, etc., are used which permit volatilization and recovery of the ammonia from the solution is vessel 76. The bicarbonate salt solution releases ammonia, water and and carbon dioxide which is removed overhead and when condensed reforms the amonium bicarbonate. Steam is suplied to exchanger 84 at asufficient rate to maintain the vapor temperature from vessel 76 from about 75°–95° C. for atmospheric operation to about 125°–150° C. for operations at presures up to about 75 to 100 p.s.i.a. The saline solution, concentrated in alkali metal and alkaline earth metal salts in vessel 76 is removed through line 86, heat exchanger 73 to the drain.

Figure 7:
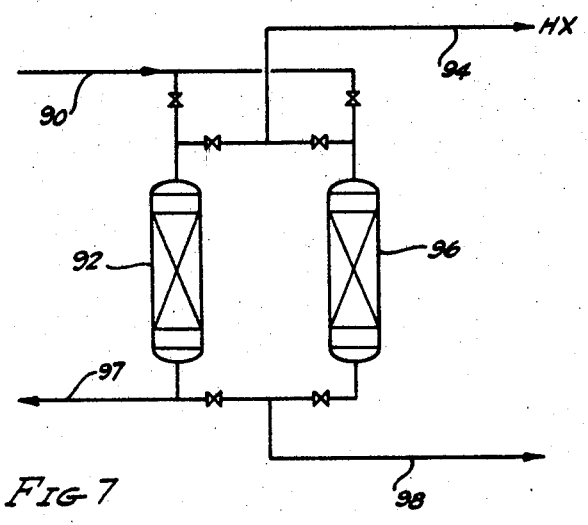

FIG. 7 illustrates an alternative regeneration technique which can be used for cationic or anionic or both cationic and anionic treatment of the irrigation water in FIGS. 1 and 2. All or a portion of the regeneration solution of nutrient salts, bases or acids enters the purification unit at 90. The amount of solution can constitute from 10 percent to the entire solution used in recharging the water treatment exchange solid, preferably from about 10 to 25 percent of this solution is purified.

The solution is passed through as column of an ion exchange solid in vessel 92. This ion exchange solid has a higher selectivity for the contaminate ions in the used regeneration solution, e.g., for the sodium and calcium cations and a lower selectivity for the plant nutrient ions still in the regeneration solution, e.g., the amonium or nitrate ions, than does the ion exchange solid used in treatment of the irregiation water. This treatment in vessel 92 effects a reduction of the contaminate ions in the regenation solution so that favorable exchange of nutrient ions for these ions can be achieved when the restored solution is used to regenerate the water treatment ion exchange solid.

Examples of ion exchange solids having a low selectivity for a plant nutrient such as ammonium with high selectivities for alkali metal or alkaline earth metal cations are the zeolites, e.g., zeolite A has relative selectivities of: sodium 100; calcium 72; and ammonium 39. With this solid in vessel 92, an ion exchange solid having about equal selectivities for ammonium and the alkali metal or alkaline earth metal cations can be used for treatment of the irrigation water. An example of such a solid would be the sulfonic acid ion exchange resins, e.g., Amberlite IR-200.

The solid in vessel 92 can be used in the hydrogen form by treatment with an acid such as hydrochloric, sulfuric, nitric, etc., introduced through line 92. Two or more solid beds can be used and alternately used as shown for continuous processing. The solid in vessel 96 is being restored by treatment with the acid while that in vessel 92 is used to purify the regenerating solution. Purified solution is removed through line 96 while a dilute solution of the contaminate salts is removed through line 98 to discard.

The several techniques shown in FIGS. 4-7 can be combined in a single treatment if desired. Thus the calcium and magnesium precipitation as insoluble oxalates or carbonates can precede the evaporative recovery of ammonia in FIG. 6 or precede the ion exchange treatment of FIG. 7 to remove residual contaminating ions, principally sodium.

The invention will now be illustrated by the following examples:

EXAMPLE 1

The invention is applied to the irrigation of citrus, valencia oranges, requiring about 3 acre feet of water per acre per year. The treatment is made by passing the irrigation water over a column of Amberlite 120-IR cation exchange resin having a capacity of about 40 kilograms per cubic foot calculated as calcium carbonate which is charged with ammonium cations. The irrigation water employed has about 120 parts per million of calcium and magnesium cationic impurities and is passed through the column of ion exchange resin at a space velocity of about 20 LSHV. The column of ion exchange resin is about 1.5 feet in diameter and about 15 feet long and the water passed through the resin in an 8-hour period is sufficient to irrigate one acre one inch in depth.

Passage of the irrigation water through the ion exchange resin at the aforeindicated space velocity is effective to replace about 70 percent of the cations impurities with ammonium cations. The application of this treatment to all the irrigation water employed for irrigation of the citrus thereby effects fertilization of the citrus at an annual rate of 240 pounds nitrogen per acre.

In an alternative adaptation, the vessel is packed with mixed ion exchange resins comprising a mixture of equal volumes of a sulfonic acid cation exchange resin and a quaternary ammonium anion exchange resin charged with ammonium cations, and nitrate anions, respectively, and the irrigation water is passed through the resin bed at a space velocity of 48.5 LHSV. The irrigation water after treatment has a nitrogen content of 210 parts per million with a pH of 6.5, and its irrigation of the citrus is effective to supply about 600 pounds nitrogen per acre at the aforeindicated annular irrigation rate.

After the capacity of the ion exchange resin has been exhausted by the passage of the irrigation water through the column, the latter can be regenerated by contacting with an aqueous solution of the desired plant nutrient salts. The mixed resin beds can be regenerated by washing with an aqueous solution of ammonium nitrate having a concentration of from 5 to 57, generally from about 10 to 20, weight percent of the dissolved salt. The water soluble salts of other plant nutrients such as ammonium phosphate, potassium chloride, potassium nitrate, ammonium thiosulfate, etc., can also be used for this treatment. When the vessel contains only a cation exchange resin, the solution used for the treatment would preferably be of a salt having a cation plant nutrient such as ammonium chloride, ammonium fluoride, or aqua ammonia. When the vessel contains only an anion exchange resin, then the regeneration can be effected by treatment with solutions of salts having anionic plant nutrients, e.g., sodium phosphate, potassium sulfate, calcium nitrate, etc., or acids of these plant nutrients, e.g., sulfuric, phosphoric or nitric acid.

The preceding illustration of the invention is set forth to describe the preferred mode of practice of the invention. It is not intended that this specific illustration be construed as unduly limiting of the invention but rather that the invention be defined by the method steps and reagents and their obvious equivalents set forth in the following claims.

I claim:

1. A method of treating saline irrigation water to effect an exchange of ionic impurities present as dissolved salts in irrigation water with plant nutrient ions of an ion exchange solid or solids, comprising passing the irrigation water through an ion exchange solid selected from the group consisting of cation exchange solids and anion exchange solids charged with ionic plant nutrients, the ionic plant nutrients of the cation exchange solids selected from the group consisting of ammonium, potassium, copper, iron or mixtures thereof, and the ionic plant nutrients of the anionic exchange solids selected from the group consisting of nitrate, sulfate, orthophosphate, polyphosphate, thiosulfate, or mixtures thereof.

2. The method of claim 1 wherein said ion exchange solid is an ammonium charged cation exchange solid.

3. The method of claim 1 wherein said ion exchange solid is a nitrate charged anion exchange solid.

4. The method of claim 1 wherein said ion exchange solid comprises a mixture of cation and anion exchange resins.

5. The method of claim 4 wherein the cation exchange resin is an ammonium charged cation exchange resin and the anion exchange resin is a nitrate charged anion exchange resin.

6. The method of claim 1 wherein from 25 to 100 percent of the annual irrigation water applied to said soil is passed through said ion exchange solid.

7. The method of claim 1 wherein said ion exchange solid is contacted with said water until its capacity to exchange said plant nutrient ions for said impurities is substantially depleted; thereafter discontinuing said contacting with water; and recharging said solid with plant nutrient ions by contacting said solid with an aqueous solution of said plant nutrient ions.

8. The method of claim 7 wherein said recharging is effected with an aqueous solution of a water soluble ammonium salt.

9. The method of claim 7 wherein from 10 to 100 percent of said aqueous solution of said plant nutrient ion after contacting with said solid is treated to remove alkaline earth metal ions therefrom.

10. The method of claim 9 wherein said treatment comprises the addition to said solution of a precipitant that releases an anion in said solution which forms an alkaline earth metal, water insoluble salt in sufficient quantity to precipitate said alkaline earth metal ions.

11. The method of claim 9 wherein said precipitant comprises oxalic acid or potassium or ammonium oxalate.

12. The method of claim 9 wherein said precipitant is carbon dioxide.

13. The method of claim 12 wherein said carbon dioxide is added in sufficient quantity to cause the crystallization of alkali metal bicarbonates in said solution.

14. The method of claim 8 wherein said solution is an aqueous solution of ammonium bicarbonate and wherein from 5 to 25 percent of said solution after contacting with said solid is heated to decompose said ammonium bicarbonate and volatilize ammonium, carbon dioxide and water from a residual solution containing said congeneric salts.

15. The method of claim 14 wherein said residual solution is discarded and said ammonia is absorbed into an aqueous solution and reused for regeneration of said solid.

16. The method of treating saline irrigation water to effect an exchange of cations such as calcium, sodium, and magnesium ions present as dissolved salts in the irrigation water with plant nutrient cations comprising passing the irrigation water through a cation exchange solid charged with cation plant nutrients selected from the group consisting of ammonium, potassium, copper, iron, or mixtures thereof.

17. The method of claim 16 wherein the cation exchange solid is an ammonium charged cations exchange solid.

18. The method of treating saline irrigation water to effect an exchange of anions, such as carbonate, bicarbonate, sulfate and halide ions present as dissolved salts in the irrigation water with plant nutrient anions, comprising passing the irrigation water through an anion exchange solid charged with anion plant nutrients selected from the group consisting of nitrate, sulfate, orthophosphate, polyphosphate, thiosulfate, or mixtures thereof.

19. The method of claim 18 wherein the anion exchange solid is a nitrate charged anion exchange solid.

References Cited
UNITED STATES PATENTS

| | | | |
|---|---|---|---|
| 2,559,529 | 7/1951 | Bauman | 210—37 |
| 2,909,002 | 10/1959 | Hendry | 47—1 |
| 3,167,505 | 1/1965 | Dunseth et al. | 210—28 |
| 3,420,773 | 1/1969 | Selmeczi | 210—37 |

REUBEN FRIEDMAN, Primary Examiner

C. N. HART, Assistant Examiner

U.S. Cl. X.R.

71—33, 57, 63; 210—37, 38